(No Model.)
F. C. SHAW.
NUT LOCK.
No. 469,602. Patented Feb. 23, 1892.
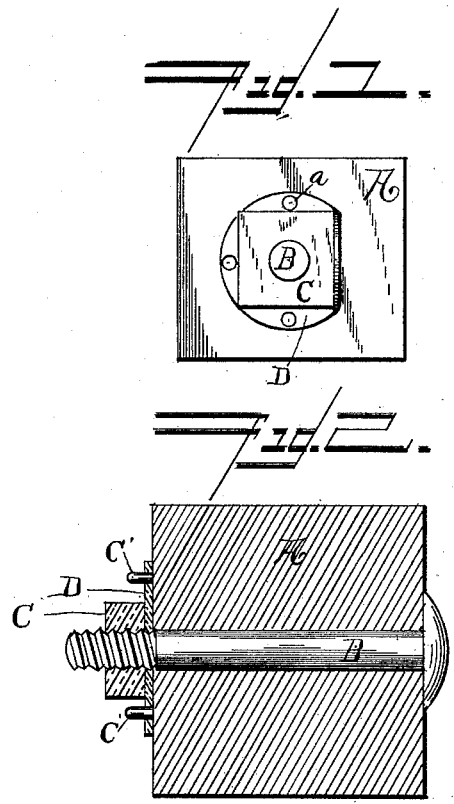
WITNESSES
C. S. Frye
Thomas E. Turpin
INVENTOR:
F. C. Shaw
by W. J. Fitzgerald & Co.
Attorneys.

UNITED STATES PATENT OFFICE.

FREDERICK C. SHAW, OF SANTA FÉ, TERRITORY OF NEW MEXICO.

NUT-LOCK.

SPECIFICATION forming part of Letters Patent No. 469,602, dated February 23, 1892.

Application filed March 18, 1891. Serial No. 384,925. (No model.)

*To all whom it may concern:*

Be it known that I, FREDERICK C. SHAW, a subject of the Queen of Great Britain, residing at Santa Fé, in the county of Santa Fé and Territory of New Mexico, have invented certain new and useful Improvements in Nut-Locks; and I do hereby declare the following to be a full, clear, and exact description of the invention, such as will enable others skilled in the art to which it appertains to make and use the same.

My invention has relation to improvements in nut-locks; and its novelty will be fully understood from the following description and claims when taken in conjunction with the annexed drawings, in which—

Figure 1 is a front elevation of my improved nut-lock in an operative position. Fig. 2 is a vertical transverse section of the same.

Referring to the said drawings by letter, A indicates an iron bar, fish-plate, or the like, through which takes a bolt or bar B, which has one end threaded, as illustrated, to receive an ordinary nut C. Formed integral with the bar or fish-plate A, and extending laterally from the face thereof at diametrically-opposite points with respect to the bolt B, are lateral studs C', which are preferably arranged in the same vertical plane, as illustrated.

D indicates the annular locking-washer of my improved device, which is provided at diametrically-opposite points with transverse apertures a, designed to receive the studs C', upon which the washer is mounted in operation. This washer D is formed of such material that it is adapted, when placed in position, to be bent up against the side of the nut, (better illustrated in Fig. 1,) so as to prevent said nut from turning off the bolt.

In operation the washer D is first placed in position, as described, and after the nut has been turned home said washer is bent up at right angles against one side of the nut, as shown in Fig. 1, whereby said nut will be rigidly held and prevented from turning off the bolt.

I am well aware that it is old in nut-locks to provide a locking-washer adapted to be bent up against the side of a nut and having lateral studs and radial keys on one side adapted to take into sockets and recesses formed in a fish-plate or beam, and I therefore make no claim to such construction; but

What I claim, and desire to secure by Letters Patent, is—

In a nut-lock, the combination, with a beam or fish-plate, a bolt taking through said beam or fish-plate and having its end threaded, a nut mounted on the threaded end of the bolt, and lugs extending laterally from the face of the beam or fish-plate at diametrically-opposite points with respect to the bolt and resting in the same vertical plane, of an annular washer interposed upon the bolt between the nut and the beam or fish-plate and having transverse apertures at diametrically-opposite points to receive the lateral lugs of said beam or fish-plate and having a segment bent up at right angles against the side of the nut, substantially as and for the purpose set forth.

In testimony whereof I affix my signature in presence of two witnesses.

FREDERICK C. SHAW.

Witnesses:
 GRANT RIVENBURG,
 IDA RIVENBURG.